US008869745B1

United States Patent
Stepanek

(10) Patent No.: US 8,869,745 B1
(45) Date of Patent: Oct. 28, 2014

(54) SYSTEM AND ELEMENT FOR CONTROLLING ODORS OF ANIMAL WASTE

(71) Applicant: Stephen Stepanek, Amherst, NH (US)

(72) Inventor: Stephen Stepanek, Amherst, NH (US)

(73) Assignee: White Cliff Pet Products, LLC, Milford, NH (US)

( * ) Notice: Subject to any disclaimer, the term of this patent is extended or adjusted under 35 U.S.C. 154(b) by 0 days.

(21) Appl. No.: 13/815,659

(22) Filed: Mar. 15, 2013

(51) Int. Cl.
*A01G 29/00* (2006.01)
*A01K 1/01* (2006.01)

(52) U.S. Cl.
CPC .................................. *A01K 1/0107* (2013.01)
USPC ........................................ 119/169; 119/171

(58) Field of Classification Search
USPC ......... 119/161, 165, 166, 167, 169, 170, 171, 119/172, 173, 526, 28.5; 604/385.23; 502/400; 424/76.6
See application file for complete search history.

(56) References Cited

U.S. PATENT DOCUMENTS

| 5,819,688 A * | 10/1998 | Walker ........................... 119/169 |
| 6,802,281 B2 * | 10/2004 | Otsuji et al. .................. 119/169 |
| 6,976,451 B2 * | 12/2005 | Helfman ........................ 119/169 |
| 7,748,348 B2 * | 7/2010 | Hurwitz ........................ 119/168 |
| 2003/0041807 A1 * | 3/2003 | Wulforst et al. ............. 119/28.5 |
| 2003/0041808 A1 * | 3/2003 | Wulforst et al. ............. 119/28.5 |
| 2003/0094140 A1 * | 5/2003 | Otsuji et al. .................. 119/169 |
| 2003/0150393 A1 * | 8/2003 | Otsuji et al. .................. 119/169 |
| 2009/0044756 A1 * | 2/2009 | Otsuji et al. .................. 119/169 |
| 2010/0285191 A1 * | 11/2010 | Etchells et al. ............... 426/415 |
| 2010/0307422 A1 * | 12/2010 | Huck et al. .................... 119/161 |

* cited by examiner

*Primary Examiner* — Trinh Nguyen
(74) *Attorney, Agent, or Firm* — Stephen W. White

(57) ABSTRACT

A special bag or pad element containing Zeolite elements is placed under normal kitty litter or other animal waste containing materials. As the odor containing substances of the waste product are emitted, they are captured and eliminated by the Zeolite contained therein. It is possible to essentially eliminated cat and pet odors as well as to contain odors from barn animals. The results are amazing and the pets are healthier and the odors are gone. The waste products from this bag can be easily recycled in a garden since the contents are compatible with the soil and offer increased fertilization from the ammonium nitrate contained therein.

4 Claims, 2 Drawing Sheets

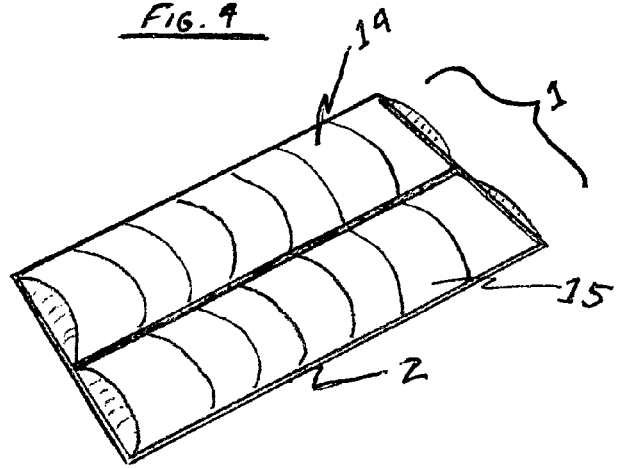
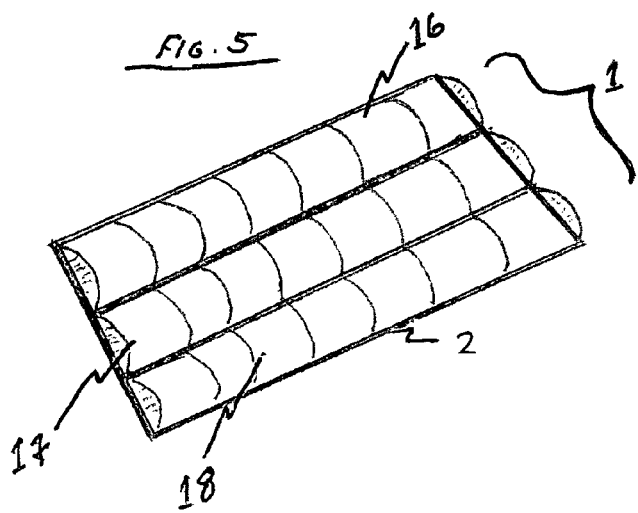
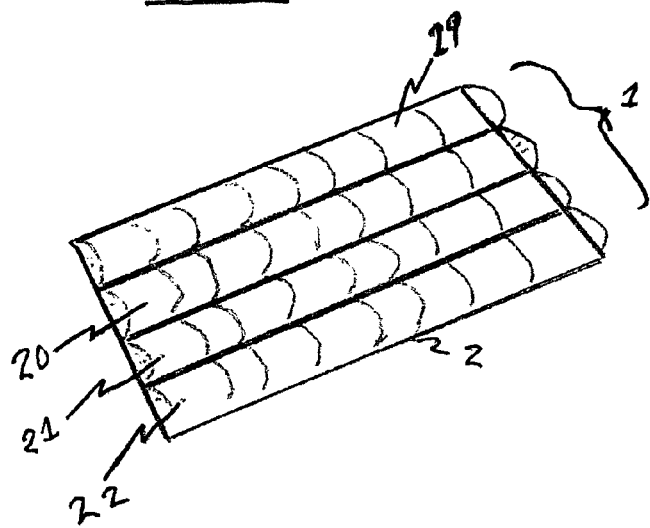

SYSTEM AND ELEMENT FOR CONTROLLING ODORS OF ANIMAL WASTE

CROSS REFERENCE TO RELATED APPLICATIONS

This invention claims the priority of my Provisional Patent U.S. Ser. No. 61/796,943 filed Nov. 26, 2012.

BACKGROUND OF THE INVENTION

1. Field of the Invention

This invention relates to the controlling of the odor found in animal waste. More particularly, this invention relates to the controlling of the odor contained in elements designed to hold and contain said animal wastes. Even more particularly, this invention relates to the controlling of the odor found in the waste product of ordinary house cats and providing the animal with a healthy and safe environment in which to deposit their waste product.

2. Description of the Prior Art

When cats are contained within a house as pets, for example, it is customary to provide a litter box for use by the cat or cats to deposit their waste products. These products consist of feces and urine. Cats are usually fussy animals and prefer a box containing some kind of granular material in which to deposit their wastes. Often time these granular materials are so-called litter elements that are often made from clay products and the like. Cats prefer to deposit their feces and urine and then cover those deposits by moving fresh litter over these deposits. The urine of animals contains a high amount of ammonia gas within the liquid and, in the case of cats, much of what they excrete with the urine are highly odiferous products. In the wild, cats will mark their territory by spraying these products or gasses on various areas to mark the territory and to deter other cats from entering. Domestic cats still excrete these odiferous elements within their urine and that is why there is a tendency for the litter box to smell badly. It is thus difficult to have cats and at the same time, provide them with the requisite comfortable litter box for their offing's without the usual smell. In addition, cats sometimes will urinate outside the litter box especially if the box is not kept clean on a regular basis. Also, it has be found that cats sometimes do not like litter materials that have been scented and such and prefer more natural products. Of course, using natural, unscented products cannot cover up the odor that may be generated.

Many litter products are said to reduce the smell from cat litter boxes. These are expensive litters that are treated with various deodorant products so as to cover up or mask the smell related thereto. They have not been all that successful in controlling the odor. Additionally, cats do not seem to like litter elements that contain these deodorant products and thus there is the chance a cat will go elsewhere outside the litter box. In addition, litters mixed with and containing Zeolite elements, are known in the prior art. They are said to be effective in containing the waste products but still are lacking in strong odor control and have been found to be unsatisfactory in containing or encapsulating the feces and urine of cats. For decades there have been efforts to use Zeolite elements within the venue of animal odor control without luck. One prior art offering infers that cats are not likely to use pure Zeolite and thus it is necessary to bring the cat up to use of Zeolite alone. It was said that the owner should start out with a low volume of Zeolite in normal kitty litter and then slowly bring the contents up to 100 percent. This was tedious and wasteful and still not satisfactory and these offerings had little success. Since these Zeolite elements are not useful in the encapsulating and retaining of these waste products, most cats do not prefer such products. Thus, there is an ever present need to provide the public with an element and a system that is easy to use and similar to conventional elements but which will effectively remove strong odors from the animal urine and excrement.

BRIEF SUMMARY OF THE INVENTION

It is an object of this invention to provide safe and effective odor control to substances used in the collection and disposal of animal waste products. It is also an object of this invention to provide such collection of animal waste products that such products can be subsequently used as fertilizers and fertilizer substitutes in the growing of land produced products (a "green" product"). It is specifically an object of this invention to provide a safe, stable and inexpensive method of controlling the strong odors produced by cats using waste kitty litter elements. These and yet other objects are achieved in an element and a process whereby Zeolite products (the elements) are contained within a bag used under conventional litter elements designed to be used to cover excrement and urine produced by animals (the process). Zeolites can be present in the weight range of from 90% to 100%. Small amounts of other materials may also be included. Other uses and products can be achieved by following the teachings of this invention and will become evident from that given below, for example.

BRIEF DESCRIPTION OF THE DRAWINGS

FIG. 4 is a perspective view of another bag or pad of this invention with two pouches.

FIG. 5 is a perspective view of another bag or pad of this invention having three pouches.

FIG. 6 is a perspective view of another bag or pad of this invention having four pouches.

DETAILS OF THE INVENTION

Figure 1:
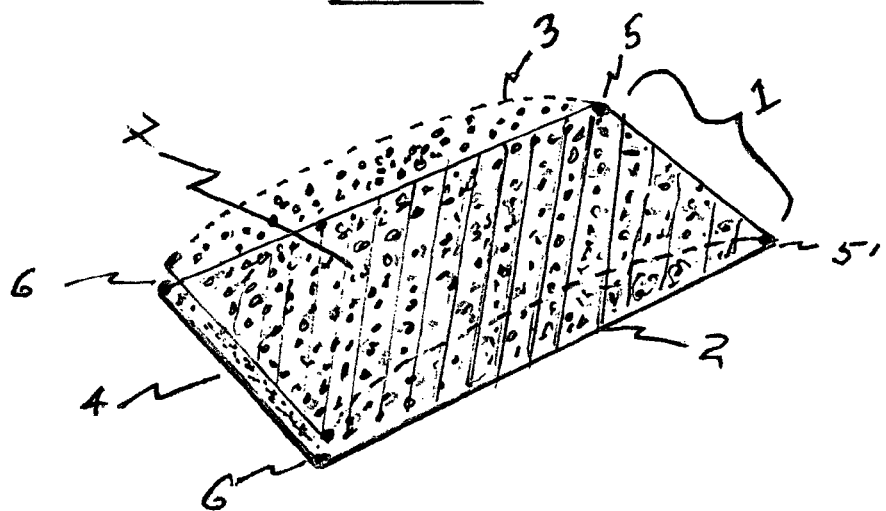
FIG. 1 is a perspective view of the bag or pad of this invention that is used to contain the special Zeolite products.

Looking now specifically at the figures provided with this invention, which are intended to describe the best mode without being limited to an even broader scope, FIG. 1 is a typical bag or pad that will contain special Zeolite particles and is designed to go under standard litter. In this perspective showing 1 is the bag or pad itself with all the parts related thereto. A bottom layer 2 (shown as a darker and thicker line) is made of a liquid impervious non-woven material. The top of the bag or pad 3 (shown as a dotted line) is made of a liquid transmitting non-woven material. At the end of the bag or pad the top and bottom is firmly connected at 5 and 5'. At the opposite end 4 the bag or pad is shown open having just been filled with a proprietary and special Zeolite material 7 obtained from producers such as St. Cloud Mining, Co. of Winston, N. Mex., or many others, wherein said Zeolite is formed from Clinoptilolite. The particles of this Zeolite are shown as dots. End 4 can be zipped closed along 6 and 6' in a conventional manner after filing the bag with the Zeolite material. Later on, when the Zeolite becomes saturated with waste liquid and odiferous materials, the bag can be opened in order to remove the Zeolite, which can function as ordinary fertilizer in a manner which will be described later on in this Specification.

Figure 2:
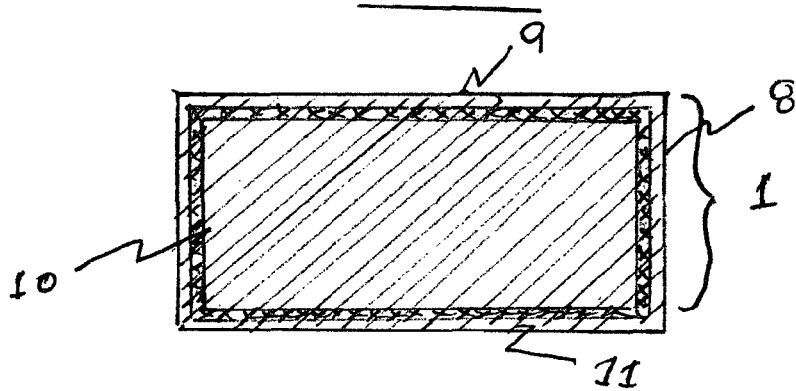
FIG. 2 is a bottom view of FIG. 1 showing contact means designed to keep the bag or pad of this invention within the confines of a litter box.

In FIG. 2 we see a bottom view of the bag or pad 1. Around the edges of the bottom are located 4 strips (shown as 8-11) which represent a double side tacky tape which has been adhered to the bottom of bag of pad 1. The surface of these strips facing upwards in this figure is covered by a removable element which protects the sticky surface and can be easily removed prior to placing the pad or bag into a litter box.

Figure 3:
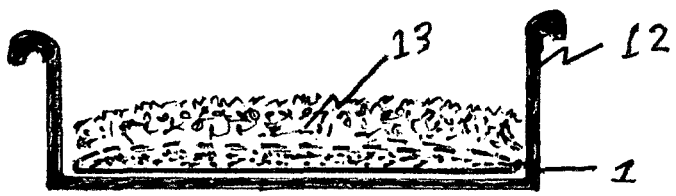
FIG. 3 is a side view of a typical litter box containing the bag or pad of this invention within the box and also containing convention litter on top.

FIG. 3 is a side view of a typical cat litter box 12 containing the bag or pad of this invention 1 adhered to the bottom of the litter box. Above this bag or pad a layer of conventional kitty litter 13 has been applied.

FIG. 4 is perspective view of the pad or bag of this invention shown as 1. In this showing the top, liquid transmitting non-woven material is shown connected to the bottom 2 in a manner so as to provide two, separate pouches or containers (14 and 15) for the Zeolite material, not shown within this drawing.

FIG. 5 is similar to FIG. 4 except there are three, separate pouches of containers (16, 17 and 18).

FIG. 6 is similar to FIG. 4 except there are four, separate pouches of containers (19-22) and is considered the best mode of this invention at the time of filing thereof.

Looking at the drawings it is obvious that any of the pads or bags of this invention loaded up with the Zeolite material and the adhesive tapes are exposed (see FIG. 2) and the pad or bag is then laid on the bottom of a typical litter box conventionally available. After the installation of this pad or bag and pressure is applied to ensure intimate contact with the bottom of the litter box, any conventional litter can be laid down over the element of this invention. We prefer using very inexpensive litter of the clumping kind and without perfume odor control added thereto. Cats can then enter the litter box and deposit urine or feces.

At this point, any liquid in the urine or feces of the cat comes into contact with the proprietary Zeolite through the non-woven top moisture pervious material of the bag. This Zeolite material may be obtained from the aforementioned St. Cloud Mining Co. or other manufacturers well known in the prior art. This particular Zeolite not only has a strong affinitive for absorbing liquid (as many Zeolite products do) but also will attract gaseous materials that emanated from the offings deposited by the cats. The liquid and the gaseous materials are completed bonded with these Zeolites and effectively removed from the surrounding areas. It should be clearly noted here that this attachment between the Zeolite and the cat liquid appears to be a chemical reaction with ammonia gases and ammonia materials thus the odor that might be present has been removed to prevent strong and noxious odors.

Within the metes and bounds of my invention I am not only describing the use of the inventive qualities of Zeolite having great use for domestic animals like cats, who in particular can produce particularly objectionable odiferous scents when depositing urine and feces but my invention may also be used with barn animals whose deposits may also be objectionable. The materials of construction may differ within this particular scope and the presence of waste covering materials may change (e.g. straw and hay vs. clay-type litters) but the process can follow the same steps. By including the proprietary Zeolites of this invention in a like manner as that described above, waste urine can be effectively trapped and then be available later on for use as a fertilizer.

The bag described within this invention is a novel means of using very effective Zeolites to capture and contain the odiferous products of animal waste. Zeolites may be costly to use as a complete litter material. Also the absorption of water is not as great as the absorption of oil products for which Zeolites are customarily used. As can be clearly seen from the description and figures above the bag or pad that is used to contain the limited amount of the Zeolite is sealed on three sides first, then the Zeolite is placed within and the fourth side sealed using a standard zipper arrangement as is conventional in the art of food bags and containers and the like. This then permits the user to withdraw the bag or pad from under the litter and dump the contents on to a garden of any time. The ammonia captured by the Zeolite will be slowly emitted and will act as a fertilizer for said garden. The Zeolite also will act as a garden soil extender since it is not an exceptionally good water absorber so does not clump up too much therein (an effective and useful "green" product involving recycle and garden use).

The fact that these Zeolites are used in this manner provides a certain amount of security for the animal that uses this within a litter box. It is cleaner, safer and healthier for the animal and the waste itself is environmentally better. It should be pointed out herein that litters and the like produced worldwide for such uses all have to be disposed in a safe manner. Most are simply dumped into waste containers and disposed along with other household trash. These litters are clay-like products and are not particularly effective when placed on the ground but tend to form a solid covering that is impervious. Even though my system as described herein uses a certain amount of other litters, that amount is greatly lessened by the system which also employs the Zeolites within the bag or pad. With the reuse of the contents of this bag in the manner described the effects on the environment are greatly lessened and the over-all costs to the consumer are also reduced. Litters that are said to remove odors simply are expensive mixes of the clay products with deodorizers. My system and elements will reduce these costs in addition to adding to the health of the animals and are better for the environment. Typical and useful Zeolites are described in a product information sheet prepared by the St. Cloud Mining Company, P.O. Box 1670, Truth or Consequences, N. Mex. and other manufacturers. This material is also known as Clinoptilolite and is eminently suitable for use within this invention, although other Zeolites (micro-porous volcanic materials described in the prior art) can be used within the metes and bounds of my invention.

This is a typical experiment using two house cats, fully litter trained and not in the habit of going outside of the two cat litter boxes normally provided. In this particular experiment, a single litter box was used along with a pad with two pouches (see FIG. 4) containing the Zeolite described above. While an expensive litter had been used before this experiment, a relatively cheap clumping litter ($0.09/lb. vs. $0.46/lb. previously) was placed on top of the two-pouched Zeolite-containing bag to a depth of approximately 4 inches. The whole area used for this experiment was thoroughly cleaned and no odors detected at this time. Both cats used this box for a period of 30 days. During that time the urine appeared to disappear being adsorbed by the two-pouched Zeolite-containing bag while the feces appeared to be dry and without much weight. The litter box was scooped twice/day and the amount of material removed appeared to be half of that normally produced by weight. Small amounts of litter were added after scooping to keep the level at the desired 4 inches. During the entire time, no odors were detected and the cats appeared to entirely approve. In fact, during one 2-day period when no one was around to take care of the litter, another litter box was left in case it might be needed. That box contained the old litter without the 2-pouched Zeolite-containing bag of this invention. On return, a small urine sample was contained within the prior art litter and most of the offings of the two cats appeared in the litter of this invention, indicating a strong preference by the cats to use this system. Considerable savings were achieved by using the inexpensive litter as compared to litters treated for odor control and the odor control was essentially complete. Additionally, when the litter box was cleaned out, taking out the liter that had accumulated as well as the bag of this invention, the box was essentially clean of dried on offing's from the cat. This is very unusual since cat urine tends to adhere to the plastic as it dries up and additionally hold a quantity of litter within the dried urine.

I claim:

1. An element for absorbing, removing and containing animal waste odors consisting of a bag formed by mating a water-impervious non-woven bottom layer said bottom layer having an inside bottom and an outside bottom and having one or more adhering strips of tape applied on said outside bottom, and a top layer comprising a water-permeable and liquid-transmitting non-woven material and contained within said bag only micro-porous volcanic powdered Zeolite material sealed therein by weight.

2. The element of claim 1 wherein said bag containing powdered Zeolite is placed within a cat litter box having a bottom and sides wherein said bag is adhered to said bottom with said adhering strips of tape and cat litter spread over said bag.

3. The element of claim 2 wherein said bag is divided into two, three or four separate pouches each pouch containing said powdered Zeolite material.

4. The element of claim 2 wherein said powdered Zeolite material is obtained from Clinoptilolite.

\* \* \* \* \*